United States Patent
Mauer et al.

(10) Patent No.: US 7,948,267 B1
(45) Date of Patent: May 24, 2011

(54) EFFICIENT ROUNDING CIRCUITS AND METHODS IN CONFIGURABLE INTEGRATED CIRCUIT DEVICES

(75) Inventors: Volker Mauer, Lacey Green (GB); Martin Langhammer, Alderbury (GB)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 12/702,445

(22) Filed: Feb. 9, 2010

(51) Int. Cl.
*H03K 19/173* (2006.01)
*G06F 7/38* (2006.01)

(52) U.S. Cl. ............................ 326/38; 708/497; 708/551

(58) Field of Classification Search .............. 326/38–41, 326/46, 47; 708/497, 498, 551, 553
See application file for complete search history.

(56) References Cited

U.S. PATENT DOCUMENTS

| | | |
|---|---|---|
| 3,473,160 A | 10/1969 | Wahlstrom |
| 4,156,927 A | 5/1979 | McElroy et al. |
| 4,179,746 A | 12/1979 | Tubbs |
| 4,212,076 A | 7/1980 | Conners |
| 4,215,406 A | 7/1980 | Gomola et al. |
| 4,215,407 A | 7/1980 | Gomola et al. |
| 4,422,155 A | 12/1983 | Amir et al. |
| 4,484,259 A | 11/1984 | Palmer et al. |
| 4,521,907 A | 6/1985 | Amir et al. |
| 4,575,812 A | 3/1986 | Kloker et al. |
| 4,597,053 A | 6/1986 | Chamberlin |
| 4,623,961 A | 11/1986 | Mackiewicz |
| 4,682,302 A | 7/1987 | Williams |
| 4,718,057 A | 1/1988 | Venkitakrishnan et al. |
| 4,727,508 A | 2/1988 | Williams |
| 4,791,590 A | 12/1988 | Ku et al. |
| 4,799,004 A | 1/1989 | Mori |
| 4,823,295 A | 4/1989 | Mader |
| 4,839,847 A | 6/1989 | Laprade |
| 4,871,930 A | 10/1989 | Wong et al. |
| 4,912,345 A | 3/1990 | Steele et al. |
| 4,918,637 A | 4/1990 | Morton |
| 4,967,160 A | 10/1990 | Quievy et al. |
| 4,982,354 A | 1/1991 | Takeuchi et al. |
| 4,991,010 A | 2/1991 | Hailey et al. |

(Continued)

FOREIGN PATENT DOCUMENTS

EP 0 158 430 10/1985

(Continued)

OTHER PUBLICATIONS

Altera Corporation, "DSP Blocks in Stratix II and Stratix II GX Devices," *Stratix II Device Handbook*, vol. 2, Chapter 6, v4.0 (Oct. 2005).

(Continued)

*Primary Examiner* — Daniel D Chang
(74) *Attorney, Agent, or Firm* — Ropes & Gray LLP; Jeffrey H. Ingerman (57) ABSTRACT

A specialized processing block for a configurable integrated circuit device includes circuitry for performing multiplications and sums thereof, as well as circuitry for rounding the result. The rounding circuitry reuses an adder that is also available, in other configurations, for accumulation of the result. Rounding is performed by adding a constant to the result and then truncating at the bit position at which rounding is desired. The constant may be entered by a user, or may be derived based on a desired rounding method from mask data entered by the user to identify the rounding bit position.

24 Claims, 10 Drawing Sheets

U.S. PATENT DOCUMENTS

| | | |
|---|---|---|
| 4,994,997 A | 2/1991 | Martin et al. |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,381,357 A | 1/1995 | Wedgwood et al. |
| 5,404,324 A | 4/1995 | Colon-Benet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim et al. |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,340 A | 3/2000 | Mintzer |
| 6,052,327 A | 4/2000 | Reddy et al. |
| 6,052,755 A | 4/2000 | Terrill et al. |
| 6,055,555 A * | 4/2000 | Boswell et al. ............... 708/551 |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |
| 6,091,261 A | 7/2000 | DeLange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |
| 6,107,824 A | 8/2000 | Reddy et al. |
| 6,130,554 A | 10/2000 | Kolze et al. |
| 6,140,839 A | 10/2000 | Kaviani et al. |
| 6,144,980 A | 11/2000 | Oberman |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |

| | | |
|---|---|---|
| 6,243,729 B1 | 6/2001 | Staszewski |
| 6,246,258 B1 | 6/2001 | Lesea |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,327,605 B2 | 12/2001 | Arakawa et al. |
| 6,351,142 B1 | 2/2002 | Abbott |
| 6,353,843 B1 | 3/2002 | Chehrazi et al. |
| 6,359,468 B1 | 3/2002 | Park et al. |
| 6,360,240 B1 | 3/2002 | Takano et al. |
| 6,362,650 B1 | 3/2002 | New et al. |
| 6,366,944 B1 | 4/2002 | Hossain et al. |
| 6,367,003 B1 | 4/2002 | Davis |
| 6,369,610 B1 | 4/2002 | Cheung et al. |
| 6,377,970 B1 | 4/2002 | Abdallah et al. |
| 6,407,576 B1 | 6/2002 | Ngai et al. |
| 6,407,694 B1 | 6/2002 | Cox et al. |
| 6,434,587 B1 | 8/2002 | Liao et al. |
| 6,438,569 B1 | 8/2002 | Abbott |
| 6,438,570 B1 | 8/2002 | Miller |
| 6,446,107 B1 | 9/2002 | Knowles |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,487,575 B1 | 11/2002 | Oberman |
| 6,523,055 B1 | 2/2003 | Yu et al. |
| 6,531,888 B2 | 3/2003 | Abbott |
| 6,538,470 B1 | 3/2003 | Langhammer et al. |
| 6,542,000 B1 | 4/2003 | Black et al. |
| 6,556,044 B2 | 4/2003 | Langhammer et al. |
| 6,557,092 B1 | 4/2003 | Callen |
| 6,571,268 B1 | 5/2003 | Giacalone et al. |
| 6,573,749 B2 | 6/2003 | New et al. |
| 6,574,762 B1 | 6/2003 | Karimi et al. |
| 6,591,283 B1 | 7/2003 | Conway et al. |
| 6,591,357 B2 | 7/2003 | Mirsky |
| 6,600,495 B1 | 7/2003 | Boland et al. |
| 6,600,788 B1 | 7/2003 | Dick et al. |
| 6,628,140 B2 | 9/2003 | Langhammer et al. |
| 6,687,722 B1 | 2/2004 | Larsson et al. |
| 6,692,534 B1 | 2/2004 | Wang et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,732,134 B1 | 5/2004 | Rosenberg et al. |
| 6,744,278 B1 | 6/2004 | Liu et al. |
| 6,745,254 B2 | 6/2004 | Boggs et al. |
| 6,763,367 B2 | 7/2004 | Kwon et al. |
| 6,771,094 B1 | 8/2004 | Langhammer et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,801,924 B1 | 10/2004 | Green et al. |
| 6,801,925 B2 | 10/2004 | Green et al. |
| 6,836,839 B2 | 12/2004 | Master et al. |
| 6,874,079 B2 | 3/2005 | Hogenauer |
| 6,904,471 B2 | 6/2005 | Boggs et al. |
| 6,924,663 B2 | 8/2005 | Masui et al. |
| 6,963,890 B2 | 11/2005 | Dutta et al. |
| 6,971,083 B1 | 11/2005 | Farrugia et al. |
| 6,978,287 B1 * | 12/2005 | Langhammer ............... 708/230 |
| 7,020,673 B2 | 3/2006 | Ozawa |
| 7,093,204 B2 | 8/2006 | Oktem et al. |
| 7,107,305 B2 | 9/2006 | Deng et al. |
| 7,113,969 B1 | 9/2006 | Green et al. |
| 7,181,484 B2 | 2/2007 | Stribaek et al. |
| 7,313,585 B2 | 12/2007 | Winterrowd |
| 7,395,298 B2 | 7/2008 | Debes et al. |
| 7,409,417 B2 | 8/2008 | Lou |
| 7,415,542 B2 | 8/2008 | Hennedy et al. |
| 7,421,465 B1 | 9/2008 | Rarick et al. |
| 7,428,566 B2 | 9/2008 | Siu et al. |
| 7,430,578 B2 | 9/2008 | Debes et al. |
| 7,430,656 B2 | 9/2008 | Sperber et al. |
| 7,472,155 B2 | 12/2008 | Simkins et al. |
| 7,536,430 B2 | 5/2009 | Guevokian et al. |
| 7,590,676 B1 | 9/2009 | Langhammer |
| 7,646,430 B2 | 1/2010 | Brown Elliott et al. |
| 7,668,896 B2 | 2/2010 | Lutz et al. |
| 7,822,799 B1 * | 10/2010 | Langhammer et al. ....... 708/551 |
| 2001/0023425 A1 | 9/2001 | Oberman et al. |
| 2001/0029515 A1 | 10/2001 | Mirsky |
| 2002/0002573 A1 | 1/2002 | Landers et al. |
| 2002/0089348 A1 | 7/2002 | Langhammer |
| 2002/0116434 A1 | 8/2002 | Nancekievill |
| 2003/0088757 A1 | 5/2003 | Lindner et al. |
| 2004/0064770 A1 | 4/2004 | Xin |
| 2004/0083412 A1 | 4/2004 | Corbin et al. |
| 2004/0103133 A1 | 5/2004 | Gurney |
| 2004/0148321 A1 | 7/2004 | Guevorkian et al. |
| 2004/0172439 A1 | 9/2004 | Lin |
| 2004/0178818 A1 | 9/2004 | Crotty et al. |
| 2004/0193981 A1 | 9/2004 | Clark et al. |
| 2004/0267863 A1 | 12/2004 | Bhushan et al. |
| 2005/0038842 A1 | 2/2005 | Stoye |
| 2005/0144212 A1 | 6/2005 | Simkins et al. |
| 2005/0144215 A1 | 6/2005 | Simkins et al. |
| 2005/0144216 A1 | 6/2005 | Simkins et al. |
| 2005/0166038 A1 | 7/2005 | Wang et al. |
| 2005/0187997 A1 | 8/2005 | Zheng et al. |
| 2005/0187999 A1 | 8/2005 | Zheng et al. |
| 2006/0020655 A1 | 1/2006 | Lin |
| 2007/0185951 A1 | 8/2007 | Lee et al. |
| 2007/0185952 A1 | 8/2007 | Langhammer et al. |
| 2007/0241773 A1 | 10/2007 | Hutchings et al. |
| 2008/0133627 A1 | 6/2008 | Langhammer et al. |
| 2009/0187615 A1 | 7/2009 | Abe et al. |

FOREIGN PATENT DOCUMENTS

| | | |
|---|---|---|
| EP | 0 380 456 | 8/1990 |
| EP | 0 411 491 | 2/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 7-135447 | 5/1995 |
| WO | WO95-27243 | 10/1995 |
| WO | WO96-28774 | 9/1996 |
| WO | WO97-08606 | 3/1997 |
| WO | WO98-12629 | 3/1998 |
| WO | WO98-32071 | 7/1998 |
| WO | WO98-38741 | 9/1998 |
| WO | WO99-22292 | 5/1999 |
| WO | WO99-31574 | 6/1999 |
| WO | WO99-56394 | 11/1999 |
| WO | WO00-51239 | 8/2000 |
| WO | WO00-52824 | 9/2000 |
| WO | WO01-13562 | 2/2001 |
| WO | WO2005-101190 | 10/2005 |

OTHER PUBLICATIONS

Amos, D., "PLD architectures match DSP algorithms," *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-92).

Andrejas, J., et al., "Reusable DSP functions in FPGAs," *Field-Programmable Logic and Applications, Roadmap to Reconfigurable Computing. 10th International Conference, FPL 2000, Proceedings (Lecture Notes in Computer Science* vol. 1896), Aug. 27-30, 2000, pp. 456-461.

Aoki, T., "Signed-weight arithmetic and its application to a field-programmable digital filter architecture," *IEICE Transactions on Electronics*, 1999, vol. E82C, No. 9, Sep. 1999, pp. 1687-1698.

Ashour, M.A., et al., "An FPGA implementation guide for some different types of serial-parallel multiplier-structures," *Microelectronics Journal*, vol. 31, No. 3, 2000, pp. 161-168.

Berg. B.L., et al."Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, p., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings-Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-186.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL '98. Proceedings*, Hartenstein, R.W., et al., eds., Aug. 31-Sep. 3, 1998, pp. 441-445.

Gaffer, A.A., et al., "Floating-Point Bitwidth Analysis via Automatic Differentiation," *IEEE Conference on Field Programmable Technology*, Hong Kong, Dec. 2002.

Guccione, S.A.,"Run-time Reconfiguration at Xilinx " *Parallel and distributed processing: 15 IPDPS 2000 workshops*, Rolim, J., ed., May 1-5, 2000, p. 873.

Hauck, S., "The Future of Reconfigurable Systems," *Keynote Address, 5th Canadian Conference on Field Programmable Devices*, Jun. 1998, http:--www.ee.washington.edu-people-faculty-hauck-publications-ReconfigFuture.PDF.

Heysters, P.M., et al., "Mapping of DSP algorithms on field programmable function arrays," *Field-Programmable Logic and Applications. Roadmap to Reconfigurable Computing. 10th International Conference, FPL 2000. Proceedings (Lecture Notes in Computer Science* vol. 1896), Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

Lattice Semiconductor Corp *ORCA® FPGA Express™ Interface Manual: ispLEVER® Version 3.0*, 2002.

Lucent Technologies, Microelectronics Group,"Implementing and Optimizing Multipliers in ORCA™ FPGAs,", Application Note. AP97-008FGPA, Feb. 1997.

"Implementing Multipliers in FLEX 10K EABs", *Altera*, Mar. 1996.

"Implementing Logic with the Embedded Array in FLEX 10K Devices", *Altera*, May 2001, ver. 2.1.

Jinghua Li, "Design a pocket multi-bit multiplier in FPGA" *1996 2nd International Conference on ASIC Proceedings (IEEE Cat. No.96TH8140)*, Oct. 21-24, 1996, pp. 275-279.

Jones, G., "Field-programmable digital signal conditioning," *Electronic Product Design*, vol. 21, No. 6, Jun. 2000, pp. C36-38.

Kiefer, R., et al., "Performance comparison of software-FPGA hardware partitions for a DSP application " *14th Australian Microelectronics Conference. Microelectronics: Technology Today for the Future. MICRO '97 Proceedings*, Sep. 28-Oct. 1, 1997, pp. 88-93.

Kramberger, I., "DSP acceleration using a reconfigurable FPGA," *ISIE '99. Proceedings of the IEEE International Symposium on Industrial Electronics(Cat. No.99TH8486)*, vol. 3, Jul. 12-16, 1999, pp. 1522-1525.

Langhammer, M., "How to implement DSP in programmable logic " *Elettronica Oggi*, No. 266, Dec. 1998, pp. 113-115.

Langhammer, M., "Implementing a DSP in Programmable Logic," *Online EE Times*, May 1998, http:--www.eetimes.com-editorial-1999-coverstory9805.html.

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Miller, N. L., et al., "Reconfigurable integrated circuit for high performance computer arithmetic," *Proceedings of the 1998 IEE Colloquium on Evolvable Hardware Systems (Digest)*, No. 233, 1998, pp. 2-1-2-4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nozal, L., et al., "A new vision system: programmable logic devices and digital signal processor architecture (PLD+DSP)," *Proceedings IECON '91. 1991 International Conference on Industrial Electronics, Control and Instrumentation (Cat. No.91CH2976-9)*, vol. 3, Oct. 28-Nov. 1, 1991, pp. 2014-2018.

Papenfuss, J.R, et al., "Implementation of a real-time, frequency selective, RF channel simulator using a hybrid DSP-FPGA architecture," *RAWCON 2000: 2000 IEEE Radio and Wireless Conference (Cat. No.00EX404)*, Sep. 10-13, 2000, pp. 135-138.

Parhami, B., "Configurable arithmetic arrays with data-driven control " *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheet", *Quicklogic*, Aug. 7, 2001, revision B.

Rangasayee, K., "Complex PLDs let you produce efficient arithmetic designs," *EDN (European Edition)* vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications (Cat. No.99EX303)*, Jul. 26-28, 1999, pp. 147-150.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Tisserand, A., et al., "An on-line arithmetic based FPGA for low power custom computing," *Field Programmable Logic and Applications, 9th International Workshop, FPL '99, Proceedings (Lecture Notes in Computer Science* vol. 1673), Lysaght, P., et al., eds., Aug. 30-Sep. 1, 1999, pp. 264-273.

Tralka, C., " Symbiosis of DSP and PLD," *Elektronik*, vol. 49, No. 14, Jul. 11, 2000, pp. 84-96.

Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.

Valls, J., et al., "A Study About FPGA-Based Digital Filters," *Signal Processing Systems, 1998*, SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1 of 4.

"Virtex-II 1.5V Field-Programmable Gate Arrays", *Xilinx*, Apr. 2, 2001, module 2 of 4.

Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication " *MathWorld—A Wolfram Web Resource* (Dec. 9, 2007), accessed Dec. 11, 2007 at http:--mathworld.wolfram.com-KaratsubaMultiplication.html.

Wenzel, L., "Field programmable gate arrays (FPGAs) to replace digital signal processor integrated circuits," *Elektronik*, vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture",*Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http:--www.iro.umontreal.ca-~aboulham-F6221-Xilinx%20A%201D%20systolic%20FIR.htm.

Xilinx, Inc., "The Future of FPGA's," White Paper, available Nov. 14, 2005 for download from http:--www.xilinx.com-prs_rls,5yrwhite.htm.

Xilinx Inc., "XtremeDSP Design Considerations User Guide," v 1.2, Feb. 4, 2005.

Altera Corporation, "Stratix II Device Handbook, Chapter 6—DSP Blocks in Stratix II Devices," v1.1, Jul. 2004.

Xilinx Inc., "Complex Multiplier v2.0", DS291 Product Specification/Datasheet, Nov. 2004.

Altera Corporation, "Digital Signal Processing (DSP)," *Stratix Device Handbook*, vol. 2, Chapter 6 and Chapter 7, v1.1 (Sep. 2004).

Haynes, S.D., et al., "Configurable multiplier blocks for embedding in FPGAs," Electronics Letters, vol. 34, No. 7, pp. 638-639 (Apr. 2, 1998).

\* cited by examiner

EFFICIENT ROUNDING CIRCUITS AND METHODS IN CONFIGURABLE INTEGRATED CIRCUIT DEVICES

BACKGROUND OF THE INVENTION

This invention relates to configurable integrated circuit devices, and, more particularly, to efficient rounding circuits and methods in specialized processing blocks which may be included in such devices.

Considering a programmable logic device (PLD) as one example of a configurable integrated circuit device, as applications for which PLDs are used increase in complexity, it has become more common to design PLDs to include specialized processing blocks in addition to blocks of generic programmable logic resources. Such specialized processing blocks may include a concentration of circuitry on a PLD that has been partly or fully hardwired to perform one or more specific tasks, such as a logical or a mathematical operation. A specialized processing block may also contain one or more specialized structures, such as an array of configurable memory elements. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

One particularly useful type of specialized processing block that has been provided on PLDs is a digital signal processing (DSP) block, which may be used to process, e.g., audio signals. Such blocks are frequently also referred to as multiply-accumulate ("MAC") blocks, because they include structures to perform multiplication operations, and sums and/or accumulations of multiplication operations.

For example, PLDs sold by Altera Corporation, of San Jose, Calif., as part of the STRATIX® family include DSP blocks, each of which includes a plurality of multipliers. Each of those DSP blocks also includes adders and registers, as well as programmable connectors (e.g., multiplexers) that allow the various components of the block to be configured in different ways. In each such block, the multipliers can be configured not only individual multipliers, but also as one larger multiplier. In addition, one complex multiplication (which decomposes into two multiplication operations for each of the real and imaginary parts) can be performed. The aforementioned adder can be used for the aforementioned accumulation function by feeding back the adder output to its input via a multiplexer that can choose to use or not use that feedback input.

The operations performed by such DSP blocks frequently require rounding. However, known rounding implementations have required the addition of circuitry to the DSP blocks.

SUMMARY OF THE INVENTION

The present invention relates to specialized processing blocks for configurable integrated circuit devices, where existing circuitry of the specialized processing blocks is used as part of the rounding function.

The specialized processing block with which the invention may be used preferably includes an adder downstream of the multipliers for accumulation purposes. The adder output is fed back to the adder input through a multiplexer, to be added to the next result. The multiplexer selects the feedback input when accumulation is turned on. Otherwise, the multiplexer selects another input which heretofore has had a fixed zero input. In accordance with embodiments of the present invention, that input can be a rounding constant.

In one preferred embodiment, where the number to be rounded has N bits, the rounding constant is an N-bit number with a "1" in the bit position to the right of the position to which the number is to be rounded, and a "0" in every other bit position. Adding this rounding constant to the number to be rounded results in adding "1" to the next less significant bit following the least significant bit of the number to be rounded, or, in other words, adding one-half to the least significant bit, which is one of the simplest forms of rounding (after truncation, which may be the simplest form of all). If the multiplexer is already provided to select accumulation or no accumulation, the only hardware addition is an N-bit memory for the rounding constant.

If the specialized processing blocks may be chained, the multiplexer may have a third "cascade" input. Because addition is commutative, it does not matter where in the chain the half-LSB is added. Therefore, mathematically speaking, the rounding constant may be added at any point in the chain. Generally, this will be the first block, because in the remaining blocks the cascade input is in use. Whether or not a cascade is used, "0" can be stored in the rounding constant memory to turn rounding off.

There are other types of rounding. For example, in biased rounding, or "round to nearest," the result is rounded down if the remainder following the LSB is less than one-half, and rounded up if the remainder following the LSB is one-half or more. This translates into simply adding the value of the bit following the LSB, and then truncating at the LSB. On the other hand, in unbiased, or "convergent" or "round to nearest even" rounding, the result is rounded down if the remainder following the LSB is less than one-half, rounded up if the remainder following the LSB is more than one-half, and, if the remainder following the LSB is exactly one-half, rounded up if the LSB is odd and rounded down if the LSB is even. This requires knowing whether there are any non-zero bits beyond the bit position following the LSB (i.e., beyond the "rounding bit" or RB), which can be determined by ORing all of those bits together.

These other rounding modes can be implemented, as discussed in more detail below, by providing, instead of a rounding constant, one or more rounding masks that identify the positions of the LSB, the RB and any bits to be discarded. ANDing the respective mask with the number to be rounded yields the LSB, RB or the number with the bits to be discarded changed to "0". Alternatively, because the RB always follows the LSB, it may be possible to derive all masks from a single mask.

Therefore, in accordance with the present invention, there is provided a specialized processing block for a configurable integrated circuit device. The specialized processing block includes arithmetic circuitry that provides a result based on arithmetic functions of inputs, accumulator circuitry including an adder to which the result is applied as a first input, and rounding circuitry including that adder and a selector that selectably applies as a second input to the adder one of (a) output of the adder, whereby the adder functions as an accumulator, and (b) a rounding constant, whereby output of the adder, truncated to a selected bit position, is a rounded version of the result.

A method of configuring such a configurable integrated circuit device to perform rounding, and a machine-readable data storage medium encoded with software for performing the method, are also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Rounding is a technique for reducing the precision of a number by removing a lower-order range of bits from that number's representation and possibly modifying the remaining portion of the number to more accurately represent its former value. For example, if the original number has N bits of precision, the rounded number may have only M bits of precision (where N>M), meaning that N−M bits of precision are removed from the number in the process of rounding.

Figure 1:
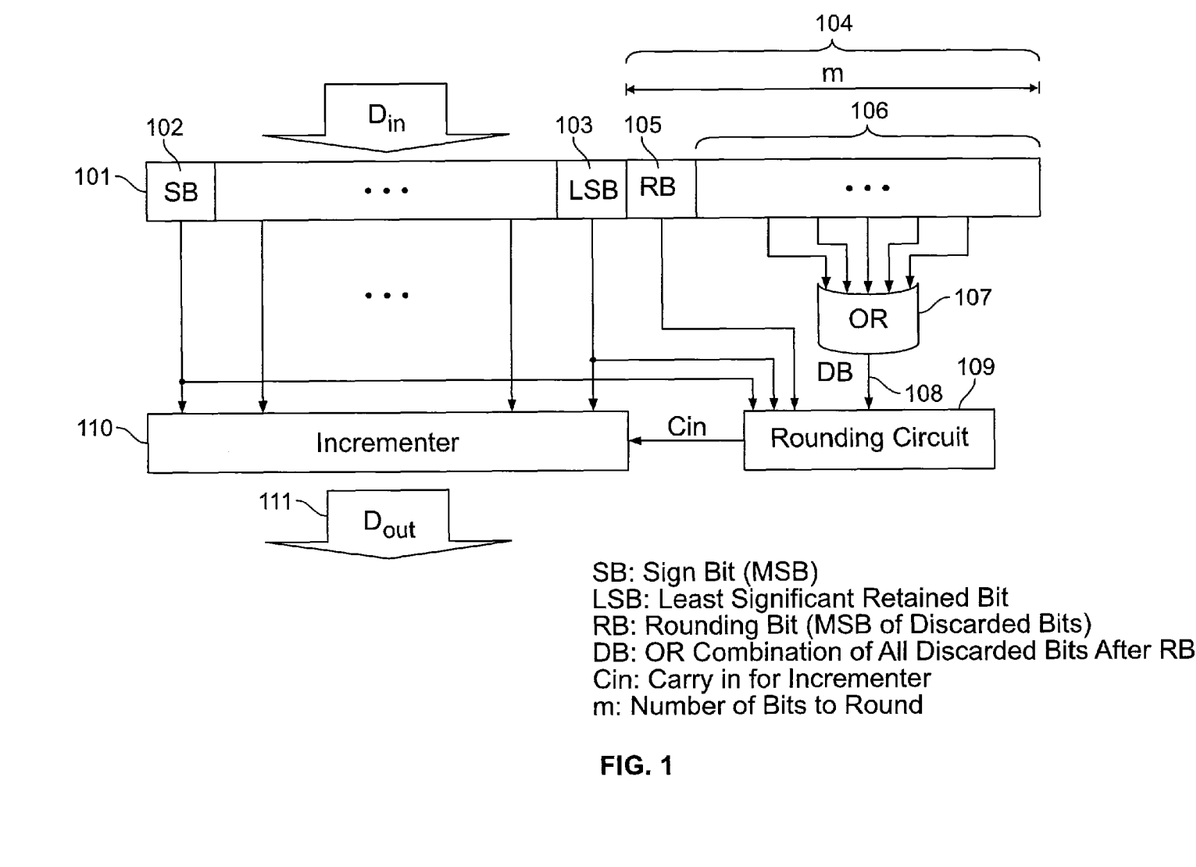
FIG. 1 is a diagram showing a known generic rounding implementation.

The various forms of rounding may be understood with reference to the diagram in FIG. 1, which shows as $D_{in}$ a number 101 having an indeterminate number of bits. The bit 102 at the far left is shown as "SB," or sign bit. This bit may indicate the sign whether signed numbers or signed magnitude numbers are used. Alternatively, with unsigned numbers, this may simply be the most significant bit. Bit 103 is the least significant desired bit ("desired LSB"). The m remaining bits 104, following desired LSB 103, are the bits to be rounded—i.e., the bits whose values determine how desired LSB 103 is rounded, after which they are discarded. The most significant of m bits 104 is the rounding bit RB 105, which is always the bit immediately following desired LSB 103. Those bits 106 of m bits 104 beyond RB 105 may be ORed at 107 to provide DB 108. DB=1 if any of bits 106 is a "1"; otherwise DB=0.

Rounding circuit 109 implements a logical expression as described below to create $c_{in}$, a value to be added, by incrementer circuit 110, to the bits that are not discarded to determine the rounded value, which is then truncated at the LSB 103 position to provide rounded output $D_{out}$ 111.

The simplest form of rounding is truncation, in which the logical expression implemented in rounding circuit 109 is $c_{in}$=0. This is a simple discarding of all m bits 104.

The next simplest form of rounding is round half-up, which has been described above, in which the logical expression implemented in rounding circuit 109 is $c_{in}$=RB. This form of rounding, which is simple to implement and therefore popular, particularly in video applications, adds a 0.5 LSB offset to all inputs, and is asymmetric. For example, both $0.5_{10}$ and $0.51_{10}$ are rounded to +1, but while $-0.51_{10}$ is rounded to −1, $-0.5_{10}$ is rounded to 0 rather than to −1.

The round-to-nearest method returns the closest number to the original. This is commonly referred to as "round-to-nearest-integer" (RNI), but as it works for numbers less than one as well, "round-to-nearest" is more appropriate. By convention, according to this method an original number lying exactly halfway between two numbers (and therefore having two numbers that are "nearest") always rounds up to the larger of the two. For example, when rounding the 3-bit, two's complement fraction 0.25 (binary 0.01) to the nearest 2-bit two's complement fraction, this method returns 0.5 (binary 0.1). The original fraction lies exactly midway between 0.5 and 0.0 (binary 0.0), so this method rounds up.

Because it always rounds up, this method is also called "biased rounding." Another way to refer to this type of rounding is "round-to-zero" because it results in a zero in the place following the LSB. In this form of rounding, the logical expression implemented in rounding circuit 109 is $c_{in}$=SB AND (RB OR DB). This form of rounding is symmetric, but may have negative gain.

The "convergent rounding," or "round-to-nearest-even" (RNE), method also returns the closest number to the original. However, in cases where the original number lies exactly halfway between two numbers, this method returns the nearest even number, which in a binary representation is the one containing a least significant bit of 0. So for the example above, the result would be 0.0, since that is the even-numbered choice as between 0.5 and 0.0. Because it rounds either up or down based on the surrounding values rather than always rounding in the same direction, this method is also called "unbiased rounding." In this form of rounding, the logical expression implemented in rounding circuit 109 is $c_{in}$=RB AND (DB OR LSB). This form of rounding is symmetric, and has no gain on average. Therefore, it is commonly used where rounding errors could accumulate.

In some circumstances RNE rounding may result in an overflow condition in $D_{out}$. Specifically, rounding up may result in a number having one more bit to the left of the binal point than the number being rounded (such as rounding from $3.5_{10}$, which in binary representation requires two bits to the left of the binal point, to $4.0_{10}$, which in binary representation requires three bits to the left of the binal point). However, there is an alternative form of unbiased rounding, called "round-to-nearest-odd" (RNO), in which in cases where the original number lies exactly halfway between two numbers, the result is the nearest odd number. This alternative does not eliminate overflows, but may result in fewer overflows than RNE rounding, in that $3.5_{10}$ becomes $3.0_{10}$ not $4.0_{10}$, $7.5_{10}$ becomes $7.0_{10}$ not $8.0_{10}$, etc.

In accordance with the present invention, rounding circuit 109 is implemented at least in part using preexisting portions of the aforementioned specialized processing block.

Figure 2:
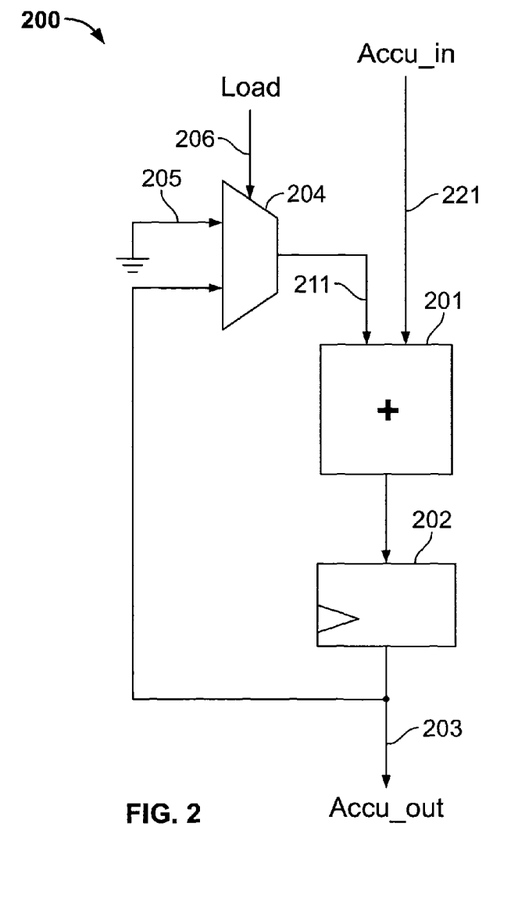
FIG. 2 is a diagram of the accumulator portion of a specialized processing block in which the present invention may be used.

FIG. 2 shows the accumulator portion 200 of a specialized processing block of the type described above. Accumulator 200 includes an adder 201 and a register 202 that registers the output of adder 201. The output of register 202, which is the accumulator output 203, is fed back through a multiplexer or other selector 204 as in input 211 to adder 201. The other input 221 to adder 201 comes from elsewhere in the specialized processing block. The other input 205 to multiplexer 204 besides feedback input 203 is a fixed ground or zero signal. In accumulator mode, load signal 206 controls multiplexer 204 to select feedback input 203 as input 211, to be added to input 221. If accumulator 200 is not being used, load signal 206 selects the fixed zero input, resulting in input 221 passing through with zero added (i.e., unchanged) to output 203. This circuitry can be used, unchanged, for truncation.

Figure 3:
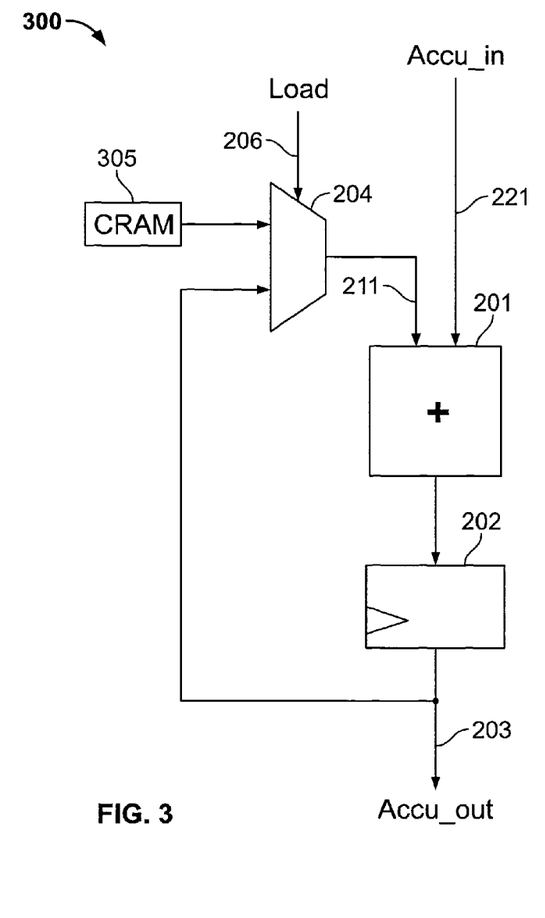
FIG. 3 is a diagram of the accumulator portion of a specialized processing block in accordance with an embodiment of the present invention.

As shown in FIG. 3, accumulator circuitry 200 can be altered by replacing fixed ground or zero input 205 with a configuration register 305, allowing resultant circuitry 300 to be configured (a) to switch (under control of load signal 206) between functioning as an accumulator or truncator by setting the configuration bits in register 305 to "0", or (b) to switch (under control of load signal 206) between functioning as an accumulator or as a round half-up circuit (in which adder 201 serves as incrementer 110) by setting the configuration value in register 305 to a value having a "1" in the position corresponding to RB (i.e., a value that is one-half the LSB value). That is, if the configuration value in register 305 is "0", then multiplexer 204 can select either feedback input 203 or zero, just as in accumulator circuitry 200. But if the configuration value in register 305 has a "1" in the position corresponding to RB, then multiplexer 204 can select either feedback input 203 (accumulator or truncation function) or one-half the LSB value (round half-up function once truncated).

Figure 4:
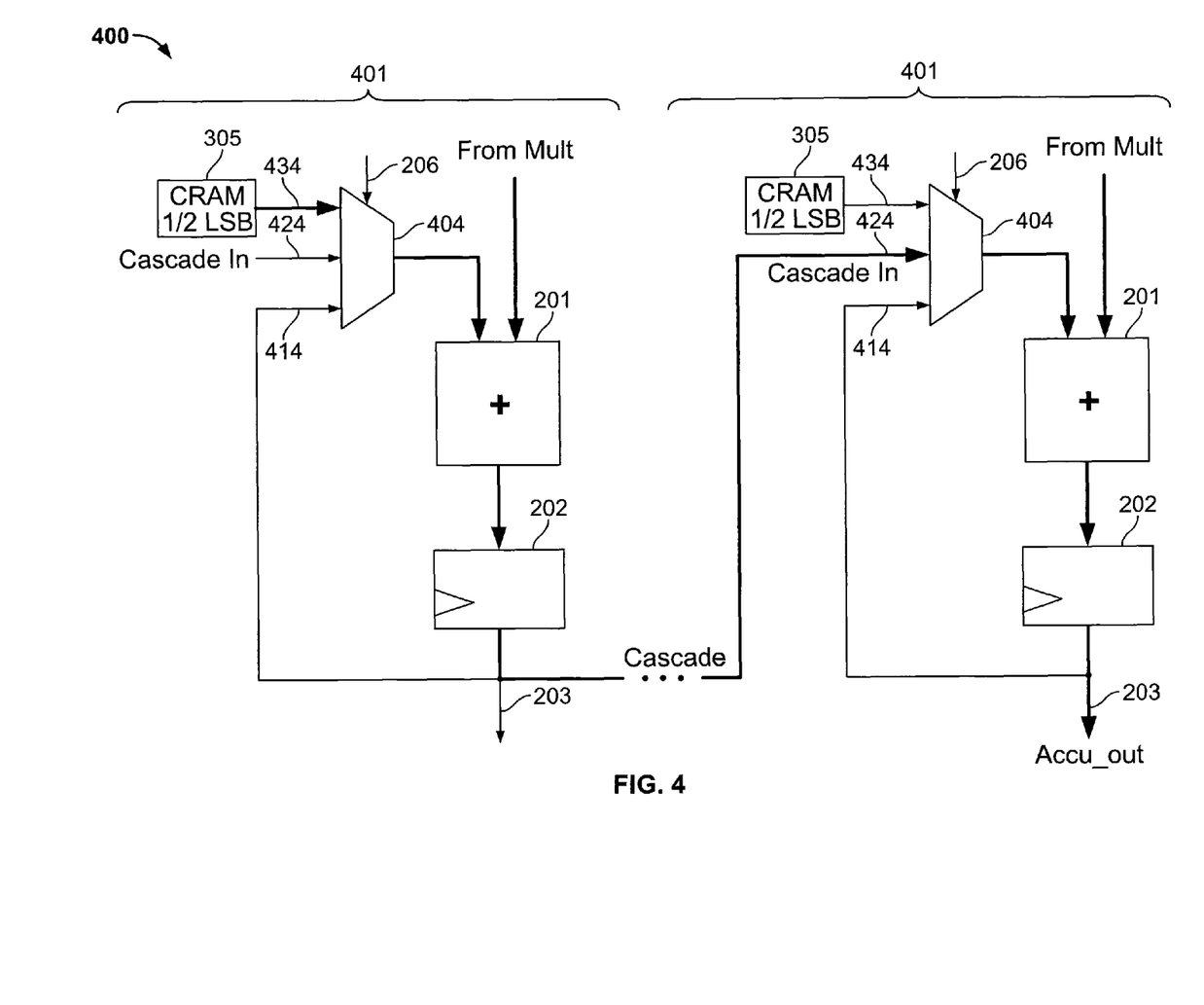
FIG. 4 is a diagram of cascaded accumulator portions of specialized processing blocks in accordance with an embodiment of the present invention.

Frequently, the aforementioned specialized processing blocks have provisions for chaining, or cascade operation. In such a case 400, as seen in FIG. 4, which shows two adder/accumulator circuits 401 configured in accordance with an embodiment of the present invention, each multiplexer 404 has three inputs—one input 414 for feedback input 203, a cascade input 424, and an input 434 for configuration register 305. When performing a round half-up operation in a cascade mode, one is rounding a sum of all of the numbers in the various stages of the cascade. And because addition is commutative, in a round half-up operation, where the rounding constant effectively is just one more addend in the cascade, it does not matter in which stage of the cascade the rounding constant is added. As a practical matter, the only stage in which the rounding constant can be added is the first stage, because in all subsequent stages, cascade input 424 is needed for the cascade; configuration register input 434 is available only in the first stage.

Figure 5:
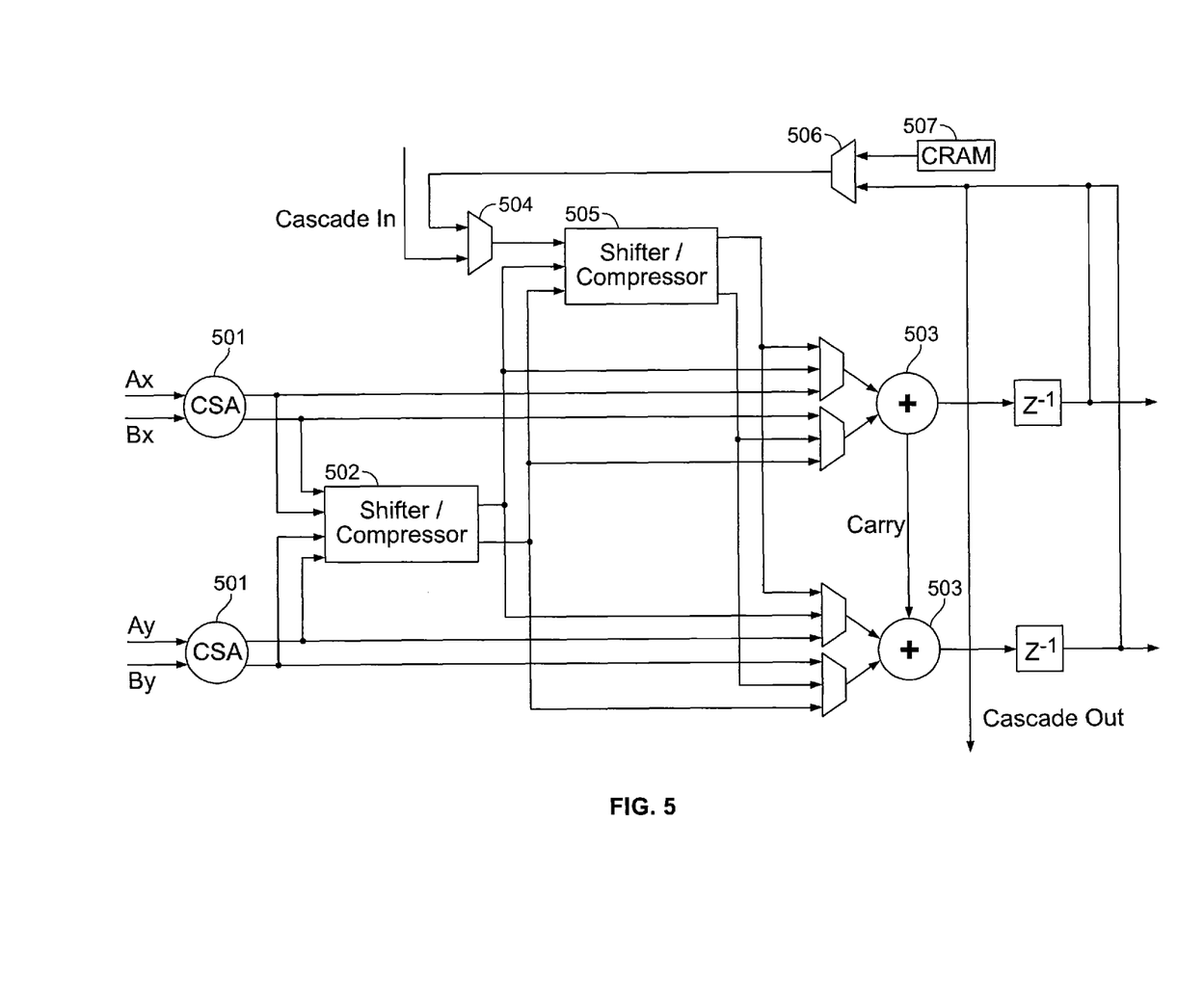
FIG. 5 is a diagram of a portion of a specialized processing block adapted to an embodiment of the present invention.

In some configurable devices including specialized processing blocks, such as the specialized processing blocks in the STRATIX® IV PLD from Altera Corporation, multipliers may be provided in indivisible units of two multipliers. Such a specialized processing block 500, adapted to the present invention, is shown in FIG. 5. In specialized processing block 500, the two carry-save adders 501 and compressor 502, along with carry-propagate adders 503, form two indivisible multipliers. Multiplexer 504 and compressor 505 further allow cascading of blocks 500.

Figure 6:
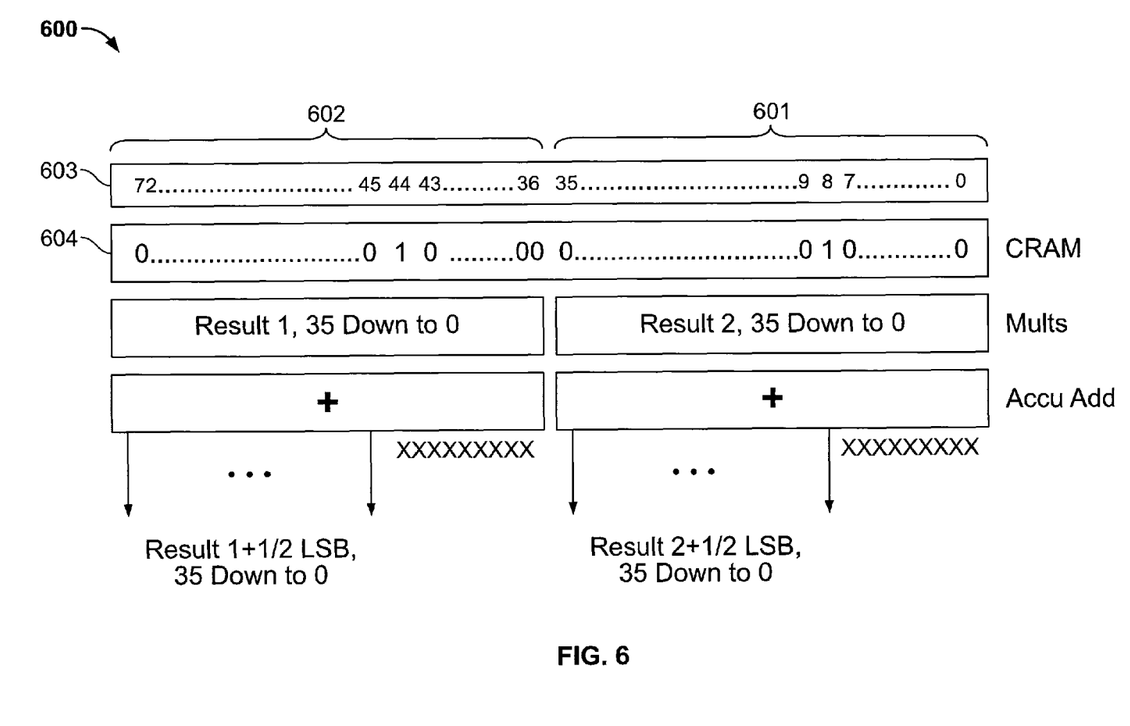
FIG. 6 is a diagram showing the rounding of two products in one specialized processing block according to an embodiment of the present invention.

To accommodate the rounding mode according to embodiments of the present invention, multiplexer 506 and configuration register 507 are provided. Because the feedback input is two concatenated products, the rounding constant stored in register 507 should be the concatenation of the individual rounding constants for the individual products. An example 600 is shown in FIG. 6. There, there are two 36-bit results 601, 602 concatenated at 603. Similarly, rounding constant 604 has two "1's" rather than a single "1" because in this example both products 601, 602 are being rounded up by one-half. In this example, RB is in the ninth bit position in both products 601, 602, but there is no reason why that is necessarily the case; the RB position could be different in the two products. Indeed, one product could be truncated, instead of rounded half-up, by providing all "0's" in that portion of rounding constant 604.

In addition, this embodiment could be implemented with less than full precision. For example, a 64-bit accumulator could be provided instead of a 72-bit accumulator. In such a case, the bits must be evenly divided between the two products. If rounding half-down is desired instead of half-up, full precision is required for the subtraction. In any case, even at full precision, the cost of a round half-up (or half-down) implementation is, per block, one N-bit multiplexer 506 and one N-bit configuration register 507, where N is the full width of the product to be rounded.

Figure 7:
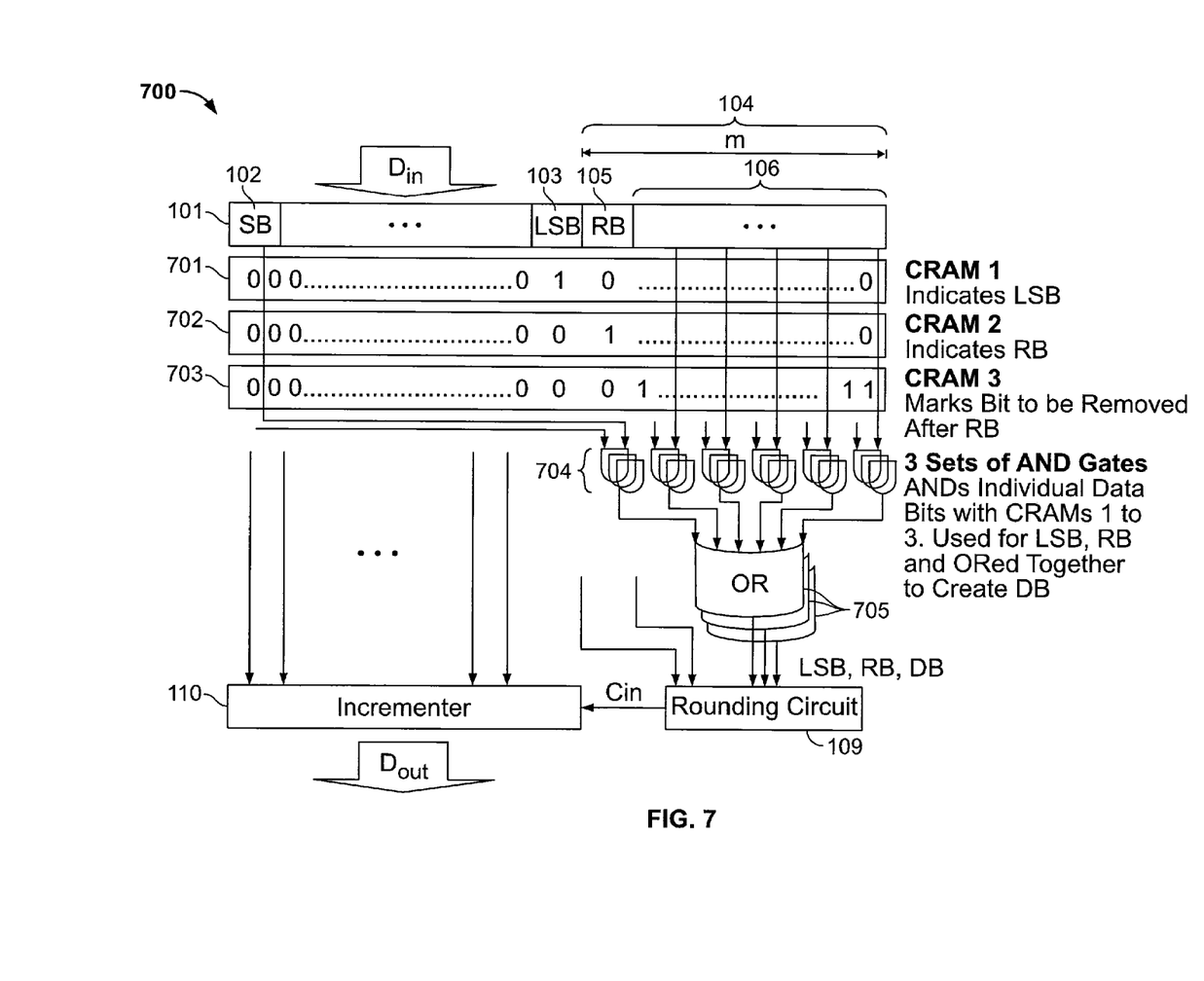
FIG. 7 is a diagram of a portion of a specialized processing block adapted to another embodiment the present invention.

As described above, in the various other rounding modes $c_{in}$ may be a function of one or more of LSB, RB and DB, implemented using rounding circuit 109 and incrementer circuit 110, which preferably is N bits wide. Some additional logic may be required to extract LSB, RB and DB from the input $D_{in}$ to be rounded. FIG. 7 shows one structure 700 including such additional logic. This structure 700 includes three N-bit configuration registers 701, 702, 703. Instead of storing a rounding constant, each of configuration registers 701, 702, 703 may be used to store a mask that indicates the bit position that the user designates as LSB or RB, or as bits beyond RB to be combined into DB. Three sets 704 of N AND-gates also are provided. One set of AND-gates 704 combines $D_{in}$ with LSB mask 701, which includes a "1" in the position designated by the user as the LSB position, to extract the value of LSB from $D_{in}$. A second set of AND-gates 704 combines $D_{in}$ with RB mask 702, which includes a "1" in the position designated by the user as the RB position, to extract the value of RB from $D_{in}$. A third set of AND-gates 704 combines $D_{in}$ with DB mask 702, which includes "1's" in the positions of all bits beyond that designated by the user as the RB position, to extract the value of RB from $D_{in}$. The outputs of each respective set of AND-gates 704 are combined in a respective one of three OR-gates 705 to yield LSB, RB and DB, respectively, which are then used as above according to the rounding mode selected by the user.

Figure 8:
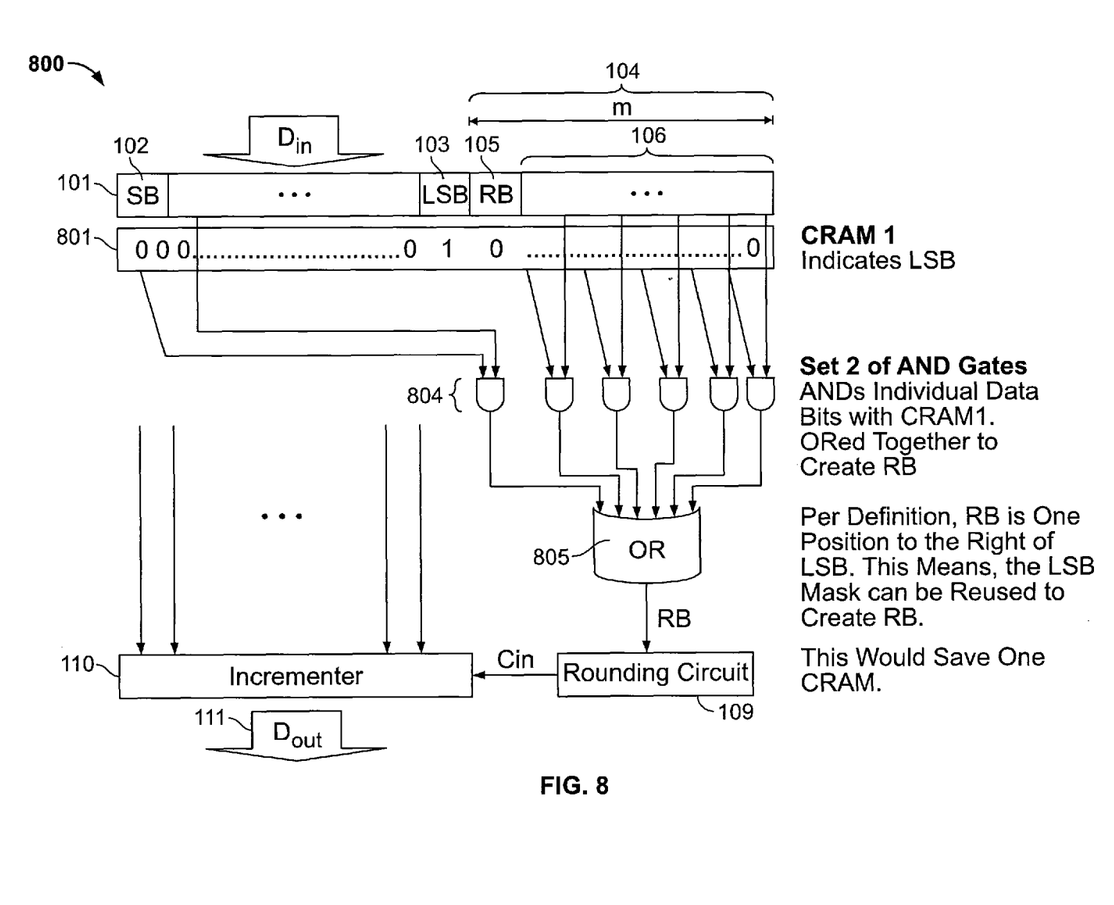
FIG. 8 is a diagram of a portion of a specialized processing block adapted to yet another embodiment the present invention.

It may be possible to reduce the number of configuration registers 701-703, because RB is always one to the right of LSB, and the bits that contribute to DB are always immediately to the right of RB. Therefore, in the embodiment shown in FIG. 8, configuration register 801 can be used to extract both LSB (not shown) and RB. As shown, when extracting RB, each respective bit of $D_{in}$ is ANDed with a bit from a respective position in LSB mask 801 that is one position to the left of the respective position in $D_{in}$. In this embodiment, only two configuration registers 801 and 703 are needed. This embodiment eliminates the need for a separate configuration register 702 for an RB mask. (Register 703 is not shown in FIG. 8, nor is a second set of AND-gates 804 or a second OR-gate 805).

Figure 9:
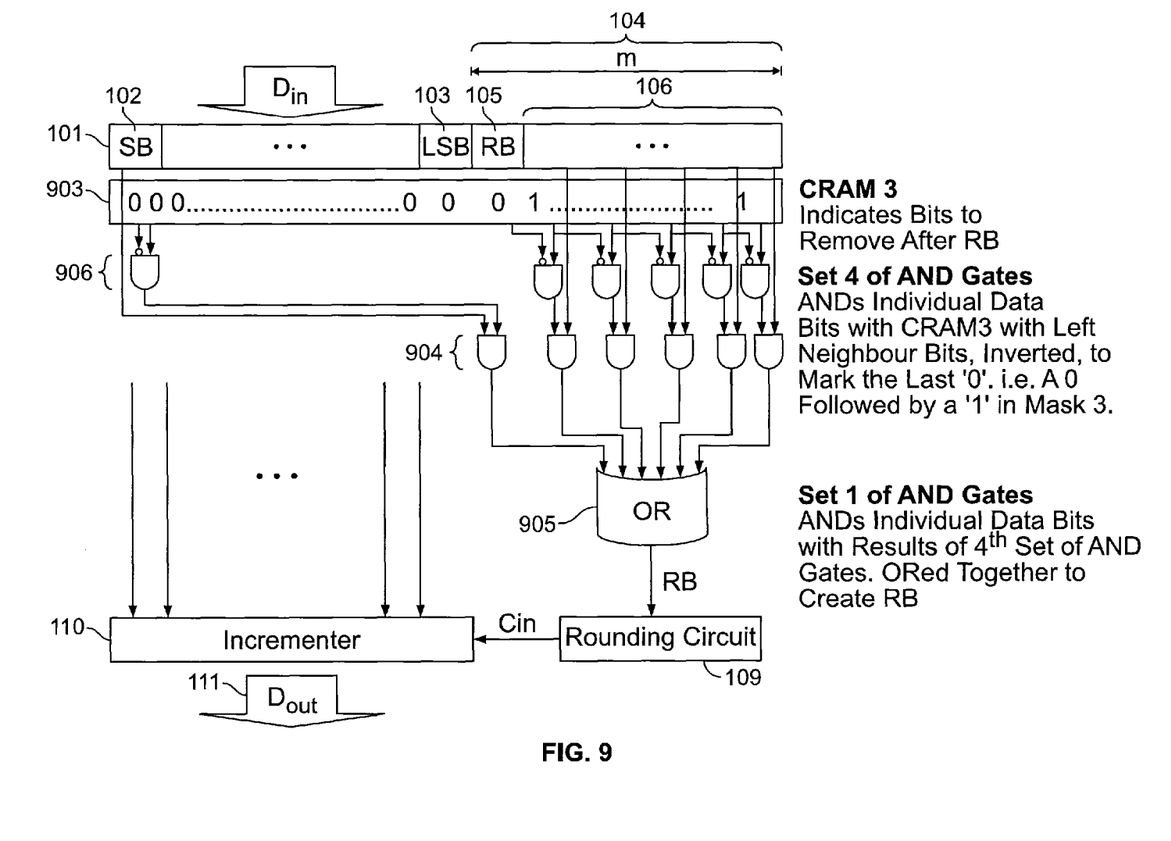
FIG. 9 is of a portion of a specialized processing block adapted to still another embodiment the present invention.

Similarly, in the embodiment shown in FIG. 9, RB can be extracted from the DB mask 903 using an additional set of N AND-gates, each of which combines a respective first value in mask 903 with the inverse of a respective second value to the left of the first value. This provides the location of the last "0" in mask 903, which is equivalent to the RB mask in configuration register 702, which can then be ANDed with $D_{in}$ at 904 and then ORed together at 905 to extract the value of RB. Thus, this embodiment, like the embodiment of FIG. 8, eliminates the need for a separate configuration register 702 for an RB mask. (Register 701 is not shown in FIG. 8, nor is a second set of AND-gates 904 or a second OR-gate 905).

Moreover, a separate configuration register 702 for an LSB mask also could be eliminated by left-shifting the derived RB mask to derive the LSB mask, or by providing a further set of AND-gates, each of which combines a respective first value in mask 903 with the inverse of a respective second value two positions to the left of the first value to derive the LSB mask. In this way, LSB, RB and DB can all be derived from the DB mask.

Whether one, two or three configuration memories are provided may be a function of the target technology. In an embodiment in which two configuration memories are provided and one is used for both LSB and RB, the present invention would require 2N configuration register bits, 3N AND-gates, and three N-input OR-gates. In an embodiment in which one configuration memory is provided and all masks are derived from it, the present invention would require N configuration register bits, 3N AND-gates plus N−1 AND-gates with one inverted input, and three N-input OR-gates. The rounding circuit and incrementer would be the same. The latter might be more appropriate for purely programmable technologies such as FPGAs where logic may be more plentiful than memory. On the other hand, the former might be more appropriate for a mask-programmed device, or an application-specific integrated circuit, where memory may be more plentiful than logic.

Instructions for carrying out a method according to this invention may be encoded on a machine-readable medium, to be executed by a suitable computer or similar device to implement the method of the invention for programming or configuring PLDs or other configurable devices for rounding operations as described above. For example, a personal computer may be equipped with an interface to which a PLD can be connected, and the personal computer can be used by a user to program the PLD using a suitable software tool, such as the QUARTUS® II software available from Altera Corporation, of San Jose, Calif.

Figure 10:
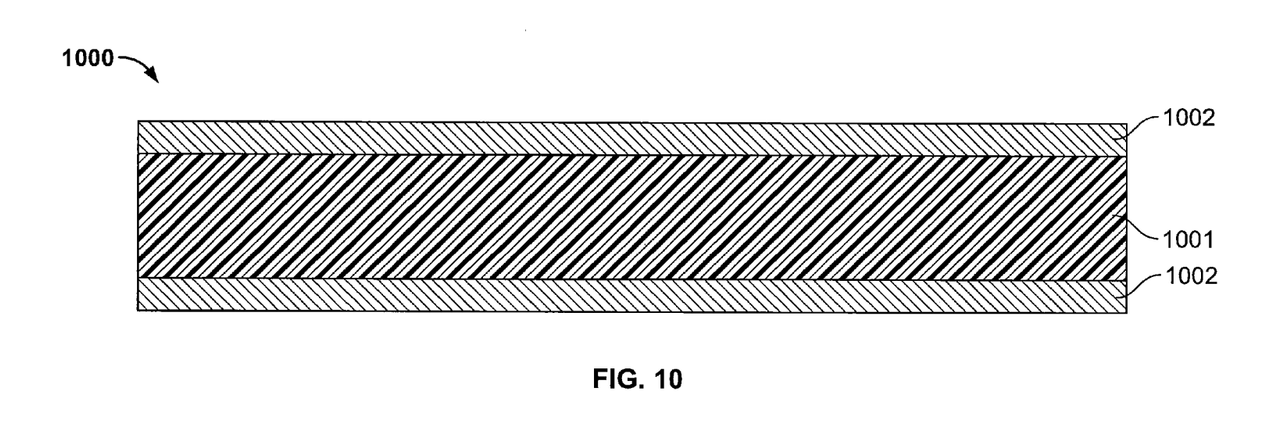
FIG. 10 is a cross-sectional view of a magnetic data storage medium encoded with a set of machine-executable instructions for performing the method according to the present invention.

FIG. 10 presents a cross section of a magnetic data storage medium 1000 which can be encoded with a machine executable program that can be carried out by systems such as the aforementioned personal computer, or other computer or similar device. Medium 1000 can be a floppy diskette or hard disk, or magnetic tape, having a suitable substrate 1001, which may be conventional, and a suitable coating 1002, which may be conventional, on one or both sides, containing magnetic domains (not visible) whose polarity or orientation can be altered magnetically. Except in the case where it is magnetic tape, medium 1000 may also have an opening (not shown) for receiving the spindle of a disk drive or other data storage device.

The magnetic domains of coating 1002 of medium 1000 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 11:
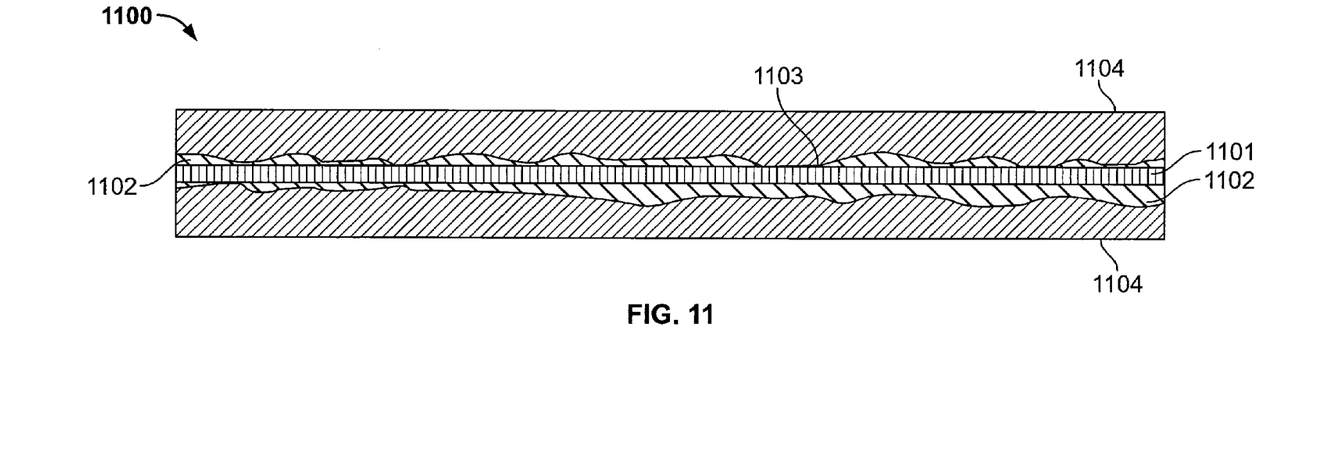
FIG. 11 is a cross-sectional view of an optically readable data storage medium encoded with a set of machine executable instructions for performing the method according to the present invention.

FIG. 11 shows a cross section of an optically-readable data storage medium 1100 which also can be encoded with such a machine-executable program, which can be carried out by systems such as the aforementioned personal computer, or other computer or similar device. Medium 1100 can be a conventional compact disk read only memory (CD-ROM) or digital video disk read only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 1100 preferably has a suitable substrate 1101, which may be conventional, and a suitable coating 1102, which may be conventional, usually on one or both sides of substrate 1101.

In the case of a CD-based or DVD-based medium, as is well known, coating 1102 is reflective and is impressed with a plurality of pits 1103, arranged on one or more layers, to encode the machine-executable program. The arrangement of pits is read by reflecting laser light off the surface of coating 1102. A protective coating 1104, which preferably is substantially transparent, is provided on top of coating 1102.

In the case of magneto-optical disk, as is well known, coating 1102 has no pits 1103, but has a plurality of magnetic domains whose polarity or orientation can be changed magnetically when heated above a certain temperature, as by a laser (not shown). The orientation of the domains can be read by measuring the polarization of laser light reflected from coating 1102. The arrangement of the domains encodes the program as described above.

Thus it is seen that a specialized processing block for configurable integrated circuit devices, where existing circuitry of the specialized processing blocks is used as part of the rounding function, as well as a method for carrying out rounding operations, and software for programming the configurable device to perform the method, have been provided.

A PLD 1210 incorporating one or more specialized processing blocks according to the present invention may be used in many kinds of electronic devices. One possible use is in a data processing system 1200 shown in FIG. 12. Data processing system 1200 may include one or more of the following components: a processor 1201; memory 1202; I/O circuitry 1203; and peripheral devices 1204. These components are coupled together by a system bus 1205 and are populated on a circuit board 1206 which is contained in an end-user system 1207.

Figure 12:
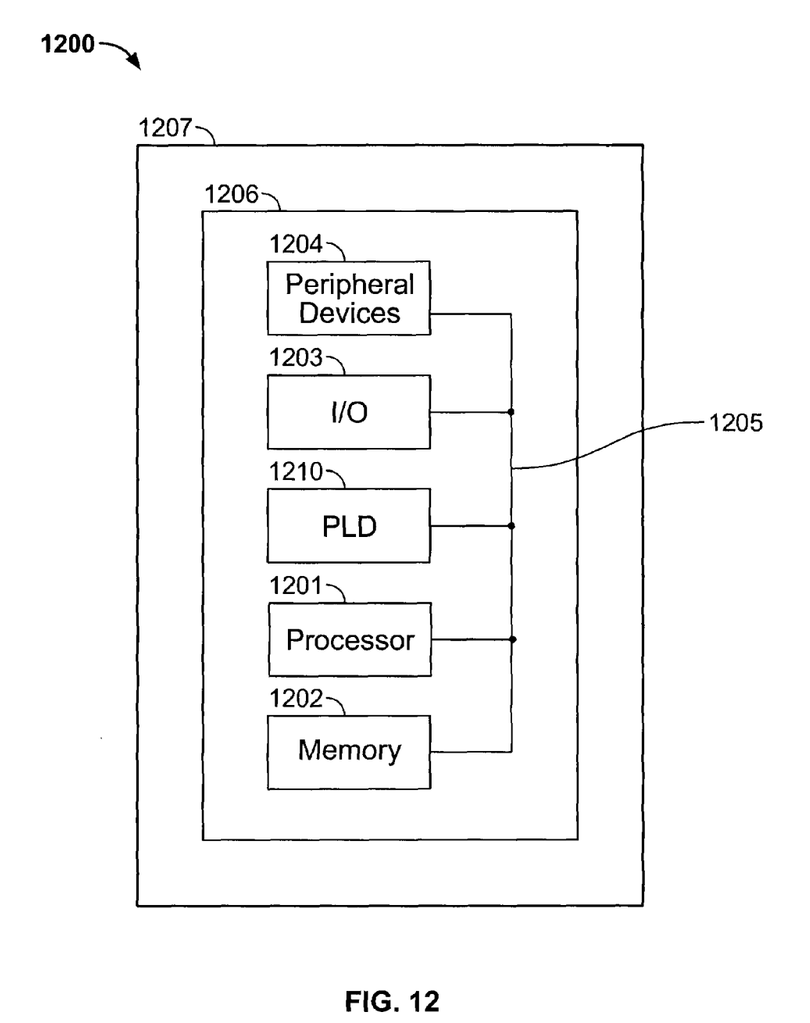
FIG. 12 is a simplified block diagram of an illustrative system employing a programmable logic device incorporating the present invention.

System 1200 can be used in a wide variety of applications, such as computer networking, data networking, instrumentation, video processing, digital signal processing, or any other application where the advantage of using programmable or reprogrammable logic is desirable. PLD 1210 can be used to perform a variety of different logic functions. For example, PLD 1210 can be configured as a processor or controller that works in cooperation with processor 1201. PLD 1210 may also be used as an arbiter for arbitrating access to a shared resources in system 1200. In yet another example, PLD 1210 can be configured as an interface between processor 1201 and one of the other components in system 1200. It should be noted that system 1200 is only exemplary, and that the true scope and spirit of the invention should be indicated by the following claims.

Various technologies can be used to implement PLDs 1210 as described above and incorporating this invention.

It will be understood that the foregoing is only illustrative of the principles of the invention, and that various modifications can be made by those skilled in the art without departing from the scope and spirit of the invention. One skilled in the art will appreciate that the present invention can be practiced by other than the described embodiments, which are presented for purposes of illustration and not of limitation, and the present invention is limited only by the claims that follow.

What is claimed is:

1. A specialized processing block for a configurable integrated circuit device, said specialized processing block comprising:

arithmetic circuitry that provides a result based on arithmetic functions of inputs;

accumulator circuitry including an adder to which said result is applied as a first input; and rounding circuitry including said adder and a selector that selectably applies as a second input to said adder one of (a) output of said adder, whereby said adder functions as an accumulator, and (b) a rounding constant, whereby output of said adder, truncated to a selected bit position, is a rounded version of said result.

2. The specialized processing block of claim 1 wherein said rounding circuitry further includes memory that stores said rounding constant.

3. The specialized processing block of claim 2 wherein said rounding circuitry further includes user input circuitry whereby a user enters said rounding constant into said memory.

4. The specialized processing block of claim 2 wherein said rounding circuitry further includes:
   mask memory that stores mask data entered by a user; and
   logic circuitry that derives said rounding constant from said mask data.

5. The specialized processing block of claim 4 wherein said mask data comprises at least one respective mask, each respective mask indicating at least one of (a) a least significant bit position to which said result is to be rounded, (b) a rounding bit position less significant than said least significant bit position, and (c) bits, less significant than said rounding bit position, to be discarded.

6. The specialized processing block of claim 5 wherein:
   said at least one respective mask comprises three masks;
   a first one of said masks indicates said least significant bit position to which said result is to be rounded;
   a second one of said masks indicates said rounding bit position less significant than said least significant bit position; and
   a third one of said masks indicates said bits, less significant than said rounding bit position, to be discarded.

7. A configurable integrated circuit device comprising the specialized processing block of claim 1.

8. The configurable integrated circuit device of claim 7 wherein said configurable integrated circuit device is a programmable logic device.

9. A digital processing system comprising:
   processing circuitry;
   a memory coupled to said processing circuitry; and
   a programmable logic device as defined in claim 8 coupled to the processing circuitry and the memory.

10. A printed circuit board on which is mounted a programmable logic device as defined in claim 8.

11. The printed circuit board defined in claim 10 further comprising:
   memory circuitry mounted on the printed circuit board and coupled to the programmable logic device.

12. The printed circuit board defined in claim 11 further comprising:
   processing circuitry mounted on the printed circuit board and coupled to the memory circuitry.

13. A method of configuring a configurable integrated circuit device that includes a specialized processing block having arithmetic circuitry that provides a result based on arithmetic functions of inputs, accumulator circuitry including an adder to which said result is applied as a first input, and a selector that selectably applies as a second input to said adder one of (a) output of said adder, and (b) a rounding constant, said method comprising:
   configuring said selector to apply said rounding constant as said second input of said adder; whereby:
   output of said adder, truncated to a selected bit position, is a rounded version of said result.

14. The method of claim 13 further comprising storing said rounding constant in a memory.

15. The method of claim 14 further comprising accepting user input of said rounding constant into said memory.

16. The method of claim 14 further comprising:
   storing mask data in a mask memory; and
   configuring logic circuitry to derive said rounding constant from said mask data.

17. The method of claim 16 wherein said mask data comprises at least one respective mask, each respective mask indicating at least one of (a) a least significant bit position to which said result is to be rounded, (b) a rounding bit position less significant than said least significant bit position, and (c) bits, less significant than said rounding bit position, to be discarded.

18. The method of claim 17 wherein:
   said at least one respective mask comprises three masks;
   a first one of said masks indicates said least significant bit position to which said result is to be rounded;
   a second one of said masks indicates said rounding bit position less significant than said least significant bit position; and
   a third one of said masks indicates said bits, less significant than said rounding bit position, to be discarded.

19. A machine-readable data storage medium encoded with machine-executable instructions for configuring a configurable device, that includes a specialized processing block having arithmetic circuitry that provides a result based on arithmetic functions of inputs, accumulator circuitry including an adder to which said result is applied as a first input, and a selector that selectably applies as a second input to said adder one of (a) output of said adder, and (b) a rounding constant, to round said result, said instructions comprising:
   instructions to configure said selector to apply said rounding constant as said second input of said adder; whereby:
   output of said adder, truncated to a selected bit position, is a rounded version of said result.

20. The machine-readable data storage medium of claim 19 further comprising instructions to configure a memory for storing said rounding constant.

21. The machine-readable data storage medium of claim 20 further comprising instructions to configure said memory for accepting user input of said rounding constant.

22. The machine-readable data storage medium of claim 20 further comprising:
   instructions to configure a mask memory for storing mask data; and
   instructions to configure logic circuitry to derive said rounding constant from said mask data.

23. The machine-readable data storage medium of claim 22 wherein said mask data comprises at least one respective mask, each respective mask indicating at least one of (a) a least significant bit position to which said result is to be rounded, (b) a rounding bit position less significant than said least significant bit position, and (c) bits, less significant than said rounding bit position, to be discarded.

24. The machine-readable data storage medium of claim 23 wherein:
   said at least one respective mask comprises three masks;
   a first one of said masks indicates said least significant bit position to which said result is to be rounded;
   a second one of said masks indicates said rounding bit position less significant than said least significant bit position; and
   a third one of said masks indicates said bits, less significant than said rounding bit position, to be discarded.

* * * * *